United States Patent [19]

Capener et al.

[11] 4,344,770

[45] Aug. 17, 1982

[54] METHOD AND APPARATUS FOR CONVERTING SOLID ORGANIC MATERIAL TO FUEL OIL AND GAS

[75] Inventors: Erwin L. Capener, Palo Alto; James M. Low, Fresno, both of Calif.

[73] Assignee: Wilwardco, Inc., San Jose, Calif.

[21] Appl. No.: 848,444

[22] Filed: Nov. 4, 1977

[51] Int. Cl.[3] .................... C10L 1/00

[52] U.S. Cl. .................... 44/50; 44/53; 44/56; 210/691; 203/10; 208/93; 201/2.5

[58] Field of Search .................... 201/2.5; 44/53, 56, 44/50; 210/73 W, 39, 40; 203/10; 208/93

[56] References Cited

U.S. PATENT DOCUMENTS

| | | | |
|---|---|---|---|
| 1,570,161 | 1/1926 | McKee | 44/56 |
| 1,752,724 | 4/1930 | Bourie | 44/56 |
| 2,847,368 | 8/1958 | Worthington et al. | 203/10 |
| 2,995,427 | 8/1961 | Sigworth et al. | 44/56 |
| 3,373,085 | 3/1968 | Masciantonio | 210/39 |
| 3,956,102 | 5/1976 | Chen et al. | 208/93 |
| 4,007,094 | 2/1977 | Greenfield et al. | 203/10 |
| 4,041,096 | 8/1977 | Kuo | 208/93 |
| 4,077,847 | 3/1978 | Choi et al. | 48/111 |
| 4,105,553 | 8/1978 | Oldham | 210/73 W |
| 4,153,514 | 5/1979 | Garrett et al. | 201/2.5 |

OTHER PUBLICATIONS

E & B '76 Marine Supply, Inc., p. 104, "Sudbury Sav-A-Tank Cartridge", 1976.

*Primary Examiner*—Winston A. Douglas
*Assistant Examiner*—Y. Harris-Smith
*Attorney, Agent, or Firm*—Victor R. Beckman

[57] ABSTRACT

Method and means for converting organic materials, such as garbage, sewage sludge, wood and agricultural products, and the like, to fuels are disclosed which include pre-drying the organic feed material and feeding the same to a reactor for the pyrolysis thereof. Pyrolytic off-gases are fed to a condenser where a condensable fraction comprising, generally, oil and water is removed. The gas phase from the condenser is scrubbed by means of a scrubber, passed through an activated charcoal filter, and burned to supply heat for at least partially drying the reactor feed material.

First gravity separating means separates the liquid phase from the condenser into oil and water fractions. Similarly, second gravity separating means, to which scrubber liquid is supplied, separates the scrubber liquid into oil and water fractions. The water fraction from the second gravity separating means is supplied as scrubbing liquid for scrubbing the gas phase. If desired, the oil fractions from said first and second gravity separators may be passed through distillation means for removal of water which may be included therein.

In accordance with the present invention, the water fraction from at least one of the first and second gravity separating means is distilled for the separation of pyrolytic oil therefrom, which heavy oil is combined with the light oil fractions from the first and second gravity separating means to lower the viscosity thereof and to add energy to the fuel. After such distillation, excess water is dumped, after first cleaning by passing the same through activated charcoal filter means. In accordance with another aspect of the present invention, fuel oil obtained by pyrolysis may be blended with methyl alcohol for esterification thereof to lower the viscosity of the oil, decrease its acidity, and increase its BTU content.

38 Claims, 4 Drawing Figures

ORGANIC FEED
COOLING FLUID
COOLING FLUID
HEATING FLUID
HEATING FLUID
BURNER-42
AIR
CHAR

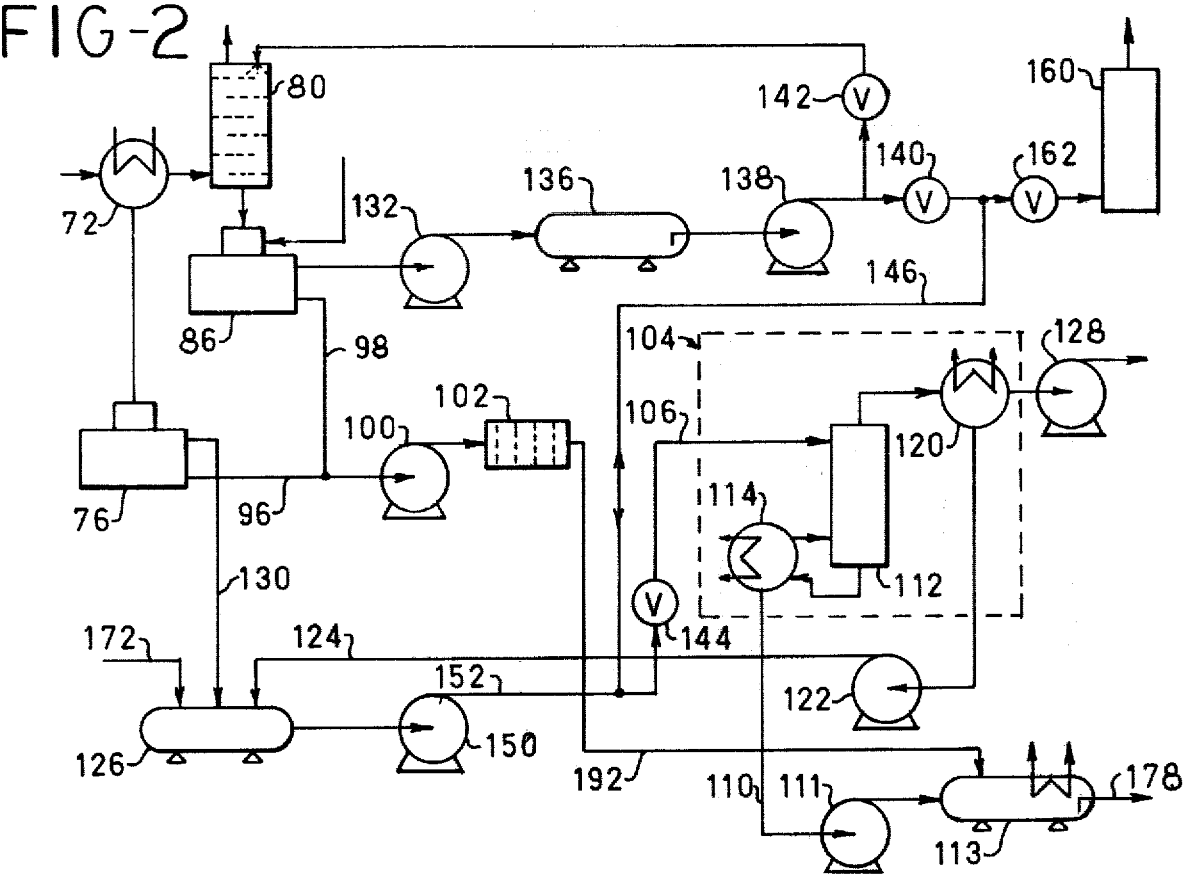
FIG-2
80
72
142
160
140
162
132
136
138
146
86
98
104
128
102
106
120
100
76
96
114
112
130
144
172
124
152
122
126
150
192
110
111
178
113
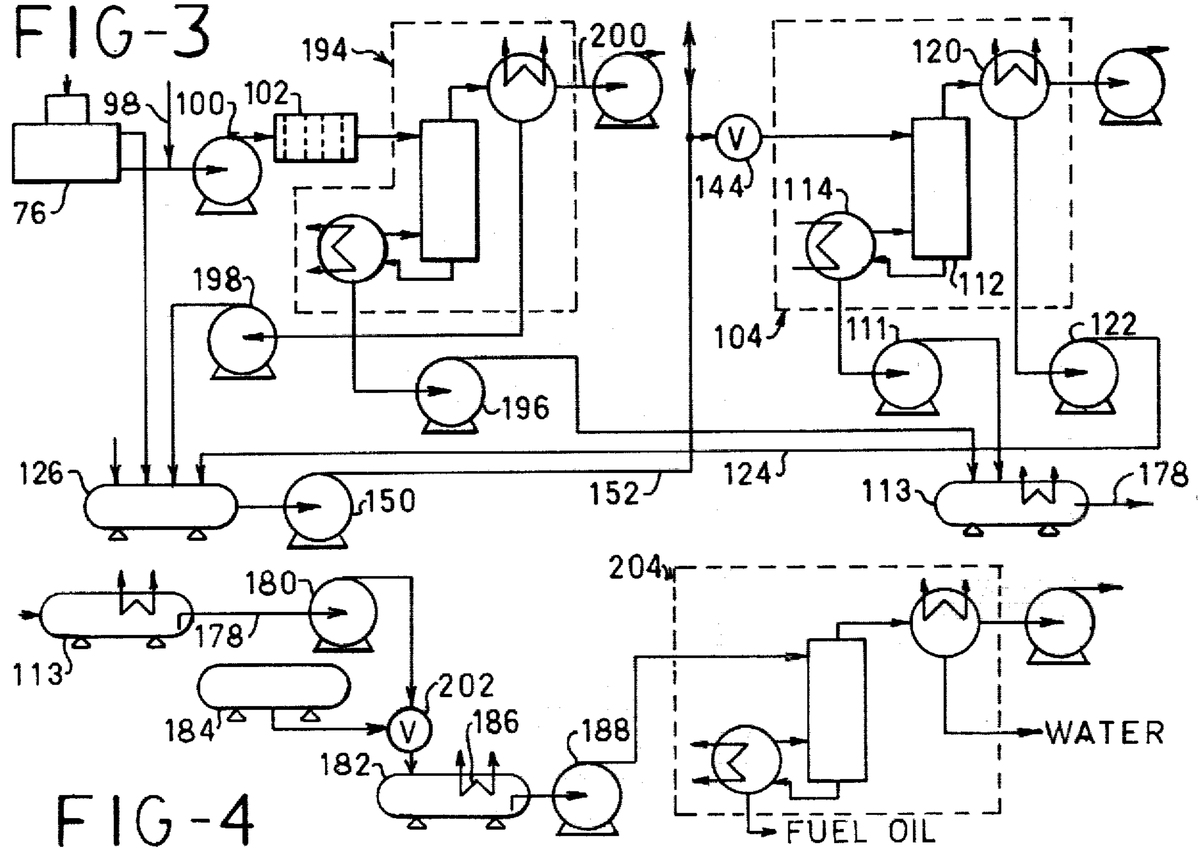
FIG-3
194
200
120
98
100
102
76
144
114
112
198
104
111
122
196
126
152
124
113
178
150
204
180
113
178
202
184
186
182
188
WATER
FIG-4
FUEL OIL

METHOD AND APPARATUS FOR CONVERTING SOLID ORGANIC MATERIAL TO FUEL OIL AND GAS

BACKGROUND OF THE INVENTION

Numerous processes for the conversion of organic material such as sawdust, sludge, rubbish, agricultural products, and the like, to liquid organic material are known as disclosed, for example, in U.S. Pat. Nos. 3,562,115; 3,298,928; 3,733,255; 3,362,887; 3,929,585; 3,970,524; and 3,702,039. However, none of the prior art methods are capable of producing high quality fuel with such low cost equipment in an environmentally acceptable manner as with the method and apparatus of the present invention.

SUMMARY OF THE INVENTION

An object of this invention is the provision of a relatively low capital cost apparatus and method for converting solid organic material, such as sawdust and woodchips, to a relatively high energy per pound content chemical fuel oil and charcoal.

An object of this invention is the provision of improved method and apparatus for processing pyrolytic off-gases obtained from the pyrolysis of solid organic material for maximizing the production of high BTU per pound chemical fuel oil therefrom.

An object of this invention is the provision of method and apparatus for disposing of organic waste material without contamination and pollution of the environment while simultaneously producing relatively high quality fuel oil therefrom.

In brief, the above and other objects and advantages of this invention are achieved by pyrolysis of at least partially dried solid organic material. A simple positive-displacement plug flow reactor, with agitating means to prevent bridging, may be used for pyrolysis. Off-gases from the reactor are separated into gas and liquid phases by condensation of the vaporized liquid contained therein. The gas stream from the condenser is cleaned by use of a scrubber, filtered and burned to provide heat for predrying the solid organic feed material. First gravity separating means separates the condensed liquid phase from the condenser into water and oil fractions. The water fraction is distilled for removal of a soluble organic chemical fraction which is combined with the oil fraction from the first gravity separating means. Scrubber liquid from the scrubber for cleaning the gas stream is supplied to second gravity separating means for separation into oil and water fractions. The oil fraction from the second gravity separating means is combined with the oil fraction from the first gravity separating means, and the water fraction therefrom is recycled as scrubbing liquid for the gas scrubber. The water fraction from the second gravity separating means recurrently is distilled for removal of soluble organic chemical fraction which too is combined with the oil fraction from the first gravity separating means. The pyrolytic oil may be blended with methyl alcohol and, if desired, heated for the esterification thereof thereby lowering the viscosity of the oil, decreasing its acidity, and increasing its BTU content.

It here will be noted that the term pyrolytic oil is an industry name for a complex mixture of organic chemicals which may include aldehydes, acids, etc. Unless otherwise noted, it will be apparent that the use herein of the terms pyrolytic oil, oil, fuel oil, and the like, refers to such a mixture of organic chemicals, and not to petroleum based oils, fatty oils, or the like.

The invention, along with the above and other objects and advantages thereof, will be better understood from the following description considered with the accompanying drawings.

BRIEF DESCRIPTION OF DRAWINGS

In the drawings, wherein like reference characters refer to the same parts in the several views:

FIG. 2 is a fragmentary schematic drawing showing a modified method embodying this invention in which a distillation step included in the FIG. 1 arrangement is deleted;

FIG. 3 is a fragmentary schematic drawing showing a modified form of apparatus embodying this invention employing a pair of distillation means instead of a single distillation means such as shown in FIGS. 1 and 2; and FIG. 4 is a fragmentary schematic drawing showing means for esterification of fuel oil for improving the quality thereof.

DETAILED DESCRIPTION

Figure 1:
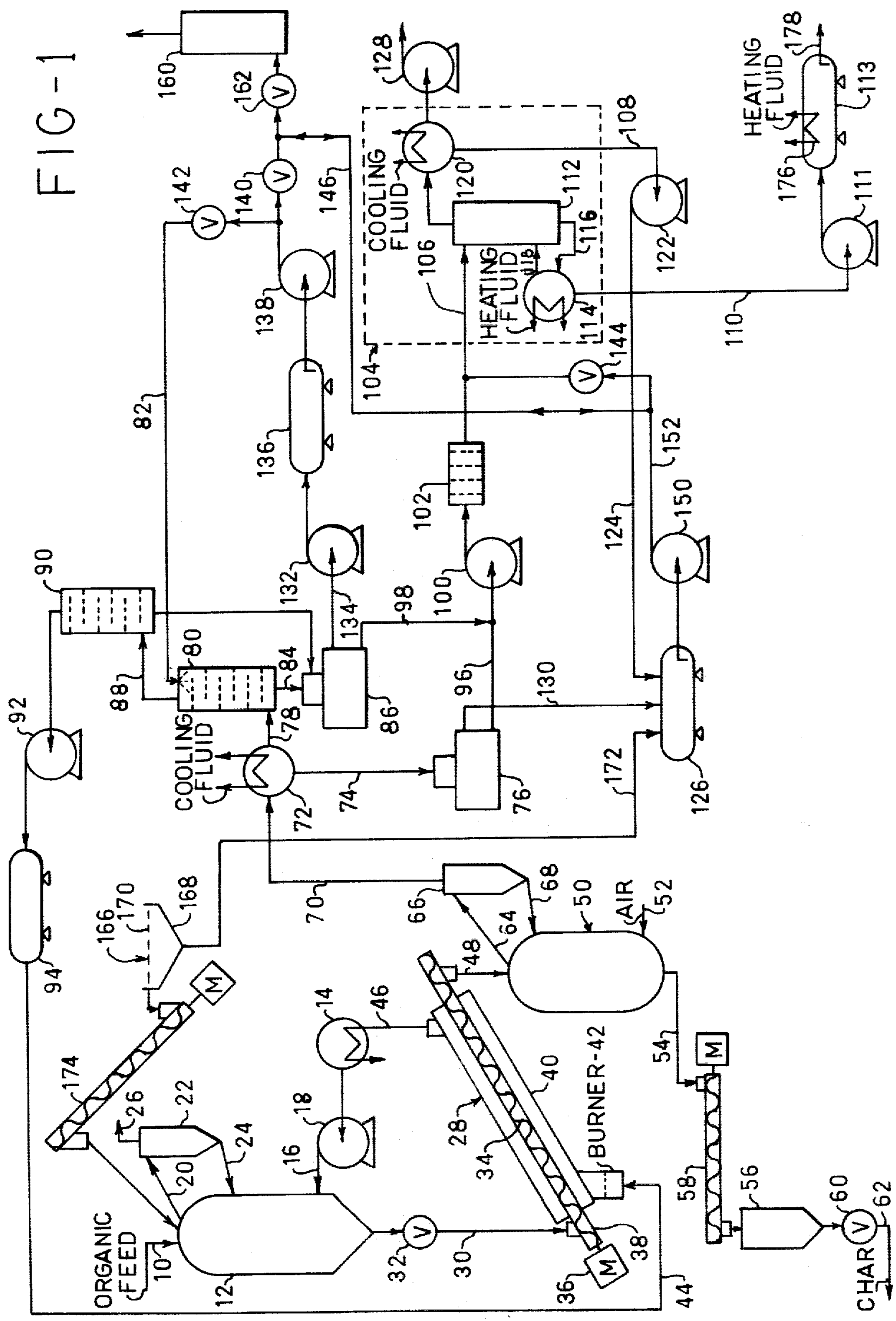
FIG. 1 is a schematic drawing showing method and apparatus embodying the present invention for converting organic waste material to fuel oil.

As noted above, the apparatus and process of the present invention for converting organic material to fuel oil may be employed with a wide variety of feed materials including refuse, garbage, sewage sludge, sawdust, wood chips, agricultural products, peat, coal, oil shale, and the like. For purposes of description only, and not by way of limitation, the detailed description which follows is directed to method and apparatus utilizing sawdust, and/or wood chips, as the feed material.

Many feed materials, including sawdust and woodchips, include relatively large amounts of water (e.g. 50 percent moisture) which must be removed to provide a high energy fuel from the process. With the present arrangement, relatively low BTU offgas obtained from pyrolysis of the feed material is used for heating and at least partially drying the material before pyrolysis to reduce the moisture content from, say, 50 percent to a feed containing from, say, 10 to 20 percent moisture. As seen in FIG. 1, feed material is supplied through conduit 10 to the top of a combination storage bin and predryer 12. Heated ambient air from a heat exchanger 14 is injected into the storage bin adjacent the bottom thereof through inlet 16 by use of a blower 18. Moist air from the top of the storage bin is passed through outlet 20 to a dry cyclone separator 22 for the removal of entrained solid feed material therefrom, which solid material is returned to the bin through inlet 24. Moisture laden air is discharged from the separator through outlet 26.

The partially predried feed material from bin 12 is further heated by passing the same through a preheater 28, the feed material being supplied to the preheater through line 20 and metering valve 32. The illustrated preheater is of the inclined screw type which includes an auger, or screw, 34 rotatably driven by a motor 36. The screw is disposed within an inner tube 38 which, in turn, is surrounded by plenum chamber 40 through which hot gas is fed for indirect heating of feed material being conveyed. The plenum chamber 40 is supplied with heated gas from a burner and air inlet 42 adjacent one end thereof. Relatively low energy gas obtained from processing of the feed material is supplied to the burner over line 44 for heating air passed through the plenum chamber. The air outlet 46 from the plenum chamber supplies heating fluid to the heat exchanger 14 used for heating the air supplied to the storage bin 12 as described above.

The heated feed material from preheater 28 passes through conduit 48 to the top of a vertical pyrolysis reactor 50 where it is heated rapidly to a temperature in the range of 1000° to 1200° F. by counter-current exchange with a rising stream of hot combustion gases generated by the partial combustion of and pyrolysis of the feed material traveling downwardly through the reactor. Air is admitted through line 52 to the bottom of the reactor to provide the necessary oxygen to sustain combustion of a small part of the feed material and maintain the temperature at an optimum value for maximum product recovery. Agitator, or vibrating, means not shown are included within the reactor to prevent bridging of the material and ensure continuous operation of the pyrolyser. Agitators and vibrators for preventing bridging are well known and require no detailed description. Also, the pyrolysis of material using heat provided by the combustion of a portion of the material is known and requires no additional description. As the feed material carbonizes char is removed from the bottom of the reactor through conduit 54 to maintain the loosely packed feed material at an equilibrium level within the reactor.

Char from outlet 54 is conveyed to a storage bin 56 by screw conveyor 58. It is sufficiently cooled in passage through the conveyor to avoid spontaneous combustion thereof. The char may be prepared for commercial use, as a substitute for powdered coal as by further crushing and screening. Also, some char may be employed in carbon adsorption filters included in the present process and described below. A valve 60 is shown included in the bin outlet 62 for feeding char from the bin.

Off-gas from the pyrolysis of the feed material is removed from the top of the reactor through outlet 64, and entrained particles are separated from the off-gas by a dry cyclone separator 66 and recycled to the reactor through conduit 68. The off-gas from the cyclone separator is fed through conduit 70 to a surface condenser 72 which also is supplied with cooling liquid from any suitable source. A condensable fraction is removed from the off-gas and supplied through conduit 74 to first gravity separating means 76. Processing of the gas phase from the condenser first is described before a description of the processing of the liquid phase therefrom.

To maximize the recovery of liquid fuel from the pyrolysis off-gas, the gas stream from the condenser 72 is fed through conduit 78 to a scrubber 80 for removal of entrained solid particulate material as well as any organic chemical vapor which may be reduced to a liquid during scrubbing. Scrubbing liquid, obtained from water vapor provided by the above-described pyrolysis is supplied to the scrubber 80 over line 82, and is removed therefrom at outlet 84. The scrubber liquid from outlet 84 is supplied to a second gravity separator 86 for processing in a manner described below. To further decrease the liquid fuel content of the gas, the gas from outlet 88 of the scrubber is passed through an activated charcoal adsorption unit 90 of any suitable type, such as a baffled knock-out drum. A blower 92 compresses the gas from the adsorption unit 90 and pumps the same to a receiver, such as storage tank 94.

This relatively low BTU gas is supplied to burner 42 of preheater 28 over line 44 for use in heating the organic feed material.

As noted above, the liquid phase from the primary condenser 72 is supplied to a first gravity separator 76, and scrubbing liquid from scrubber 80 is supplied to a second gravity separator 86. Liquids to the separators comprise, essentially, water which contains water soluble organic chemicals, and the desired "pyrolytic oil" comprising insoluble organic chemicals, into which fractions the liquid is at least partially separated by the separators. Where the term "water soluble organic chemical fraction" or simply "water fraction" is used to describe one fraction from the separators, it will be understood that such fraction also will include small amounts of "lighter" water insoluble organic chemicals. Similarly, the so-called water insoluble organic chemical fraction, or simply "oil fraction" from the separators also will include small amounts of water soluble material.

The oil fraction from the two gravity separators 76 and 86 is withdrawn over lines 96 and 98, respectively, and pumped by pump 100 through a filter 102 for removal of entrained sawdust and char. Depending upon operating temperatures and the composition of the feed material, the oil fraction may be obtained either from the upper or from the lower separator outlet, and in the drawing the oil fractions are shown obtained from lines 96 and 98 at the lower end of the separators.

The filtered oil fraction may be distilled by distillation means 104 for additional removal of water therefrom. (It here will be noted that oil fractions from the separators which contain substantially no water are obtainable, in which case no distillation of the oil fraction may be provided, and in an alternative embodiment of this invention, shown in FIG. 2 no distillation of the filtered oil fraction is provided.) In the arrangement of FIG. 1, the oil fraction from filter 102 is supplied to the distillation means 104 over line 106. The water fraction from the distillation is removed through outlet 108, and the oil fraction (less the removed water) is obtained from outlet 110.

For purposes of illustration, the distillation means 104 is shown comprising a fractionating column 112 of any suitable type to which the material to be distilled is fed. The material is heated by means of a heat exchanger 114 through which liquid material from the column 112 is circulated through heat exchanger inlet 116 and outlet 118. Oil from the distillation means is obtained from the bottom of the heat exchanger 114 through the outlet 110 and is pumped by pump 111 to a storage tank 113. Vapor ascends within the column, mixing with descending liquid supplied thereto. The vapor passes to a condenser 120 for cooling, and the liquid condensate from the condenser is pumped, by pump 122, over line 124 to a storage tank 126. The condensate comprises, primarily, water and water soluble organic chemicals which were contained in the pyrolytic oil supplied to the distillation means. Gases from the condenser are removed by a vacuum pump 128 to further lower the temperature to which the pyrolytic oil is subjected. As noted above, generally only small additional amounts of water are removed by distillation of the oil fractions from the gravity separators 76 and 86, and this distillation may be deleted from the process without greatly impairing the quality of fuel oil obtained by the process.

The water fraction from the gravity separator 76 is transferred to the storage tank 126 over line 130, and the water fraction contained in the tank 126 is further processed in a manner described below. The water fraction from the gravity separator 86 is recycled through the scrubber 80 as the scrubbing liquid. A pump 132 is used to transfer the water fraction from outlet 134 of the gravity separator 86 to a storage tank 136. From the storage tank 136, the water fraction may be pumped by pump 138 to any one of three locations, including the scrubber 80, depending upon the state of valves included in the system. Thus, as seen in FIG. 1, with valve 140 closed and valve 142 opened, the water fraction is pumped through line 82 to the scrubber 80 for scrubbing the gas supplied thereto.

As noted above, liquid from the scrubber is subjected to gravity separation for removal of insoluble organic chemicals before recycling to the scrubber. The concentration of water soluble and "light" water insoluble organic chemical material in the scrubber water build up with recycling, and in accordance with one aspect of the present invention the scrubber liquid is distilled for removal of such water soluble liquid organic material for combining with the water insoluble fractions obtained from the gravity separators. The distillation means 104 used for distillation of water soluble fractions from the separators 76 and 86 also may be used for distillation of the scrubber liquid. The valve 140 and a valve 144 are included in the connection of the scrubber liquid to the distillation means. Consequently, with the proper adjustment of valves, including the opening of the valves 140 and 144, scrubber liquid from storage tank 136 is pumped through valve 140, line 146, valve 144 and line 106 to the distillation means 104. Light water soluble organic chemical liquid (light oil) from the distillation means is obtained from the bottom of the heat exchanger 114 through line 110 and pumped to storage tank 113 for combining with the "heavy" oil obtained from the oil fractions from the gravity separators 76 and 86. The water fraction from the distillation means is pumped over line 124 to the storage tank 126. A new supply of scrubbing liquid may be obtained from storage tank 126, which liquid is pumped by pump 150 to the scrubber liquid circuit through lines 152 and 146, and open valves 140 and 142.

The water fraction from the gravity separating means 76, stored in tank 126, also is distilled for removal of light water soluble organic liquid material remaining therein. In the FIG. 1 arrangement, the above-described distillation means 104 is used for such distillation. With valve 144 in the open condition, the water fraction from storage tank 126 is pumped by pump 150 through line 152, open valve 144, and line 106 to the inlet to the distillation means 104. As with the above-described distillation of scrubber liquid, a light oil fraction is obtained by the distillation of the water fraction from the gravity separator 76 which oil is obtained from outlet 110 from the distillation means and pumped to storage tank 113 for combining with oil fractions from the gravity separating means 76 and 86.

After distillation, water contained in storage tank 126 may be dumped in a sewer, evaporation pond, or the like. If desired, or required by pollution laws, the water may be fed through activated charcoal for removal of organic material before dumping. In FIG. 1 the water fraction is filtered by activated charcoal filter means 160 which utilizes char produced by the illustrated process or commercially available activated carbon, for adsorption of such organic material. Water which has been passed through distillation means 104, for the removal of remaining light oil, and returned to storage tank 126, is pumped from tank 126, and supplied to the filter means 160 through lines 152 and 146, and a valve 162 in the open position for dumping. Substantially no organic chemical material remains in the dumped water.

Spent charcoal from the knock-out drum 90 and filter means 160 may be recycled for the removal of any oil contained therein and recovery of char. To this end, the charcoal removed therefrom may be supplied to a solid-liquid separator means 166 comprising, for example, a combination hopper 168 and a vibrating screen conveyor 170. Liquid which drains from the charcoal through the screen conveyor into the hopper is fed from the hopper and through line 172 to the storage tank 126. The char is transported by the conveyor section 170 to a conveyor 174 for passage to the top of the storage bin 12 for processing along with the feed material. As noted above, liquid in the storage tank 126 is fed through distillation means 104 for the removal of oil therefrom before dumping. Consequently, oils removed from the scrubber liquid and dumped water by carbon adsorption units 90 and 160, respectively, are returned to the system for recovery thereof.

With the process of the present invention substantially all water soluble organic material obtained by the pyrolysis of the feed material is recovered, including the "light" oils. Substantially all water is removed from the liquid fuel to provide for a high energy-per-pound fuel. By including the "light" oils in the liquid fuel product, the viscosity thereof is reduced over arrangements wherein, say, only the heavy oils are recovered. Any desired use of the liquid fuel product may be made, including firing a boiler.

The viscosity of liquid fuel obtained from the process depends upon the organic chemical content of the feed material. With feed material from wood products, the liquid fuel has a relatively high viscosity, and heating means 176 may be included in the storage tank 113 to lower the viscosity thereof for ease of flow from outlet 178.

The invention having been described in detail in accordance with the requirements of the Patent Statutes, various changes and modifications will suggest themselves to those skilled in this art. For example, it will be understood that the gravity separators 76 and 86 may be operated to provide oil fractions which are substantially free of water, in which case distillation of the oil fractions from said gravity separators for water removal may be omitted. A portion of the process showing such modification is shown in FIG. 2 to which reference now is made. The arrangement is the same as that shown in FIG. 1 except that the oil fractions from the gravity separating means 76 and 86 are pumped by pump 100 through filter 102 and line 192 directly to the storage tank 113, thereby bypassing the distillation means 104. The water fractions from said gravity separators are distilled in the manner described above for removal of light pyrolytic oils therefrom, which oils are pumped to the storage tank 113 from the distillation means 104 by pump 111. With this arrangement, substantially continuous recycling through the distillation means of the water fraction contained in storage tank 126 may be provided.

In a further modification, shown in FIG. 3, separate distillation means for distillation of the oil fractions from the gravity separators may be provided. In FIG. 3, the filtered oil fraction from filter 102 is pumped to second distillation means 194 which may be of the same type as distillation means 104 shown in detail in FIG. 1. Oil from distillation means 194 is pumped by pump 196 to the storage tank 113; the water fraction is condensed and pumped by pump 198 to water storage tank 126, and vapor is discharged through outlet 200. Somewhat improved distillation separation is provided by the illustrated use of separate distillation means for the oil and water fractions from the gravity separators.

Other variations include the use of mixing, or blending, valves for some of the valves illustrated in FIG. 1. For example, the valve 144 may comprise a mixing valve in which case a continuous supply of a blend of heavy oil from filter 102 and water fraction from tank 126 is provided to the distillation means 104. Also it will be apparent that the process is readily adapted for operation under automatic electronic process control.

In accordance with another aspect of the present invention the viscosity of the pyrolysis oil and the corrosiveness thereof may be reduced by blending the same with up to approximately 15 percent methyl alcohol. The methyl alcohol reacts with acids in the fuel oil for esterification thereof. In FIG. 4, to which reference now is made the heated oil from outlet 178 of storage tank 113 is pumped by pump 180 through a blending valve 202 which is also supplied with methyl alcohol from storage tank 184. The mixture then goes to a heated reaction tank 182. Heating means 186 are included for heating the mixture of pyrolytic oil and methyl alcohol to improve the rate of esterification. Additionally, a catalyst may be included in the tank 182 to speed up the esterification reaction. Fuel from the tank 182 may be pumped by pump 188 to distillation means 204, which may be of the same type as distillation means 104 shown in FIG. 1, for removal of water produced during esterification. Alternatively, the water may be left in the oil, depending upon the solubility thereof with petroleum based fuel oils with which the present fuel oil may be blended. After esterification and distillation, the fuel oil may be pumped to a suitable storage tank, not shown. The resulting fuel oil, after esterification, is of lower acidity and lower viscosity. It has a higher BTU content per unit weight, and is well suited for use with existing furnace pumping systems. It here will be understood that by simply blending the pyrolytic fuel oil with methyl alcohol, without subsequent esterification, an improved product having lower viscosity is provided. Obviously, the invention is not limited to esterification of the blended product, although esterification may occur over a period of time, say, during storage, without heating.

It is intended that the above and other such changes and modifications shall fall within the spirit and scope of the invention as defined in the appended claims.

We claim:

1. A method of converting organic material such as sawdust, wood chips, sewage sludge, agricultural products, and the like, to fuel oil comprising, heating organic material for at least partial pyrolytic conversion to pyrolytic gases, separating by condensing means said gases into liquid and gas phases by condensing condensable vapor included in said gases, separating said liquid phase by first gravity separating means into water and oil fractions, distilling said water fraction from said first gravity separating means for separation of water soluble oil therefrom, and combining said water soluble oil from said distillation step with the oil fraction from said first gravity separating means to lower the viscosity and add to the energy content thereof.

2. The method of converting organic material to fuel oil as defined in claim 1 including, blending the combined oil obtained from said distillation step and first gravity separating means with methyl alcohol for reducing the viscosity of said oil.

3. The method of converting organic material to fuel oil as defined in claim 2 including, heating said blended oil and methyl alcohol for esterification of organic acids included therein to reduce acidity and corrosiveness thereof.

4. A method of converting organic material such as sawdust, wood chips, sewage sludge, agricultural products, and the like, to fuel oil comprising, heating organic material for at least partial pyrolytic conversion to pyrolytic gases, separating by condensing means said gases into liquid and as phases by condensing condensable vapor included in said gases, separating said liquid phase by first gravity separating means into water and oil fractions, distilling said water fraction from said first gravity separating means for separation of water soluble oil therefrom, distilling said oil fraction from said first gravity separating means for removal of at least a portion of remaining water therefrom, and combining said water soluble oil from distillation of said water fraction from said first gravity separating means with said oil from distillation of said oil fraction from said first gravity separating means to lower the viscosity and add to the energy content thereof.

5. The method of converting organic material to fuel oil as defined in claim 4 wherein said oil and water fractions from said first gravity separating means are distilled by passing the same through the same distillation means.

6. The method of converting organic material to fuel oil as defined in claim 5 wherein said oil and water fractions from said first gravity separating means alternately are passed through said distillation means for distillation thereof.

7. The method of converting organic material to fuel oil as defined in claim 4 wherein said oil and water fractions from said first gravity separating means are distilled by individually passing the same through separate distilling means.

8. The method of converting organic material to fuel oil as defined in claim 1 including, scrubbing the gas phase from said condensing means with aqueous scrubbing liquid for removal of oil therefrom, separating said scrubbing liquid by second gravity separating means into water and oil fractions, distilling said water fraction from said second gravity separating means for separation of oil therefrom, and combining oil obtained from distillation of said water fraction from said second gravity separating means with said oil obtained from said distillation of said water fraction from said first gravity separating means and the oil fraction from said first gravity separating means to further lower the viscosity and add to the energy content thereof.

9. A method of converting organic material such as sawdust, wood chips, sewage sludge, agricultural products, and the like, to fuel oil comprising, heating organic material for at least partial pyrolytic conversion thereof to obtain pyrolytic off-gases, separating by condensing means said off-gases into liquid and gas phases, scrubbing the gas phase with aqueous scrubbing liquid for removal of oil therefrom, separating said scrubbing liquid into water and oil fractions, recycling said water fraction as scrubbing liquid for scrubbing said gas phase, distilling the recycled water fraction obtained by said separation of said scrubber liquid into water and oil fractions for cleaning the recycled water fraction prior to dumping by removal of water soluble oil therefrom, separating by gravity separating means said liquid phase from said condensing means into oil and water fractions, and combining said water soluble oil fraction obtained by distillation of said recycled water fraction with said oil fraction from said gravity separating means for lowering the viscosity and adding to the energy content of the oil fraction from said gravity separating means.

10. The method of converting organic material to fuel oil as defined in claim 9 including, distilling said oil fraction from said gravity separating means for removal of water therefrom prior to combining said oil fraction obtained by distillation of said recycled water fraction therewith.

11. The method of converting organic material to fuel oil as defined in claim 9 including, distilling the water fraction from said gravity separating means for removal of oil therefrom, and combining said oil obtained by distillation of the water fraction from said gravity separating means with said oil fraction from said gravity separating means to further lower the viscosity and add to the energy content thereof.

12. The method of converting organic material to fuel oil as defined in claim 11 including, distilling said oil fraction from said gravity separating means for removal of water therefrom prior to combining therewith said oil fractions obtained by distillation of said recycled water fraction and by distillation of said water fraction from said gravity separating means.

13. Apparatus for recovering fuel oil from organic feed material such as sawdust, wood chips, and the like, comprising, pyrolytic converting means for at least partially pyrolytically converting organic feed material supplied thereto, condensing means for separating condensable and non-condensable vapors included in off-gases from said pyrolytic converting means, first gravity separating means for at least partially separating the condensable vapors from said condensing means into water and oil fractions, distilling means for at least partially separating water soluble oil included in said water fraction from said first gravity separating means from said water fraction, and means for combining water soluble oil obtained from said distilling means by distillation of the water fraction from said first gravity separating means with the oil fraction from said first gravity separating means for lowering the viscosity and adding to the energy content thereof.

14. Apparatus for recovering fuel oil from organic feed material as defined in claim 13 including, second distilling means for distilling said oil fraction from said first gravity separating means for at least partially removing water included therein before oil obtained by distillation of the water fraction from said first gravity separating means is combined therewith at said combining means.

15. Apparatus for recovering fuel oil from organic feed material as defined in claim 13 including, means for supplying said oil fraction from said first gravity separating means to said distilling means for at least partially removing water included therein before oil obtained by distillation of the water fraction from said first gravity separating means is combined therewith at said combining means.

16. Apparatus for recovering fuel oil from organic feed material as defined in claim 15 including, means for alternately supplying said water and oil fractions from said first gravity separating means to said distillation means.

17. Apparatus for recovering fuel oil from organic feed material as defined in claim 13 including, means for receiving said water fraction from said distilling means through said distilling means.

18. Apparatus for recovering fuel oil from organic feed material as defined in claim 13 including, gas scrubbing means supplied with gases from said condensing means and with scrubbing liquid for scrubbing said gases, second gravity separating means for at least partially separating scrubbing liquid from said scrubbing means into water and oil fractions, and means for recycling at least a portion of said water fraction from said second gravity separating means through said gas scrubbing means as said scrubbing liquid.

19. Apparatus for recovering fuel oil from organic feed material as defined in claim 18 including, means for supplying at least a portion of said water fraction from said first gravity separating means to said gas scrubbing means as scrubbing liquid for scrubbing gases supplied thereto.

20. Apparatus for recovering fuel oil from organic feed material as defined in claim 18 including, heating means supplied with gases obtained from said scrubbing means for heating and predrying feed material supplied to said pyrolytic converting means.

21. Apparatus for recovering fuel oil from organic feed material as defined in claim 18 including, means for supplying said water fraction from said second gravity separating means to said distilling means for at least partially separating oil therefrom for combining with said oil fraction from said first gravity separating means.

22. Apparatus for recovering fuel oil from organic feed material as defined in claim 13 including, means for blending oil obtained from said distilling means with methyl alcohol for reducing the viscosity thereof and for esterification of organic acids included in said oil to reduce acidity and corrosiveness of said oil.

23. A liquid fuel suitable for burning in furnaces, and the like, obtained by esterification of organic acid-containing pyrolytic oil.

24. A process for enhancing properties of organic acid-containing fuel oil suitable for use in burning in furnaces, and the like, comprising esterification of organic acid contained in said fuel oil for reducing the acidity, corrosiveness and viscosity of the fuel oil.

25. The process for enhancing properties of acid-containing fuel oil as defined in claim 24 wherein said acid-containing fuel oil is obtained by pyrolytic conversion of organic material, said process including condensing condensable off-gases from the pyrolysis, and gravity separating the condensed gases into water and acid-containing fuel oil fractions.

26. A liquid fuel suitable for use in burning in furnaces, and the like, obtained by blending of organic acid-containing pyrolytic oil and methyl alcohol for reduction of the viscosity of the pyrolytic oil without degrading the BTU content thereof.

27. A liquid fuel as defined in claim 23 obtained by esterification of organic acids included in said pyrolytic oil with alcohol.

28. A liquid fuel as defined in claim 27 wherein said alcohol comprises methyl alcohol.

29. A liquid fuel as defined in claim 23 obtained by blending organic acid-containing pyrolytic oil with alcohol, and heating said blend for esterification of organic acids included in said pyrolytic oil with said alcohol.

30. A liquid fuel as defined in claim 29 obtained by removal of water following esterification.

31. A liquid fuel as defined in claim 30 wherein water is removed by distillation.

32. The process for enhancing properties of acid-containing fuel oil as defined in claim 24 wherein said esterification includes reacting organic acid contained in said fuel oil with alcohol for esterification thereof.

33. The process for enhancing properties of acid-containing fuel oil as defined in claim 32 which includes blending said organic acid-containing fuel oil with alcohol.

34. The process of enhancing properties of acid-containing fuel oil as defined in claim 33 which includes heating said blend of alcohol and acid-containing fuel oil to accelerate esterification.

35. The process for enhancing properties of acid-containing fuel oil as defined in claim 34 including removing water produced as a result of esterification.

36. A process for enhancing properties of acid-containing fuel oil as defined in claim 35 wherein water is removed by distillation.

37. The method of converting organic material to fuel oil as defined in claim 1 including, filtering by activated charcoal filter means water obtained from said distillation step for removal of organic chemical material therefrom prior to dumping the same.

38. The method of converting organic material to fuel oil as defined in claim 37 including, supplying spent charcoal from said activated charcoal filter means to solid-liquid separator means for separating liquid from said spent charcoal, combining liquid from said solid-liquid separator means with said water fraction from said first gravity separating means for distillation thereof with said water fraction, and heating charcoal from said solid-liquid separator means with said organic material for at least partial pyrolytic conversion to pyrolytic gases.

* * * * *